United States Patent [19]

Deutsch et al.

[11] Patent Number: 4,817,370
[45] Date of Patent: Apr. 4, 1989

[54] MOLDED COTTON DOOR AND MOUNTING STRUCTURE THEREFOR

[75] Inventors: Timothy A. Deutsch, Newton; Virgil D. Haverdink, Ankeny, both of Iowa

[73] Assignee: Deere & Company, Moline, Ill.

[21] Appl. No.: 87,075

[22] Filed: Aug. 19, 1987

[51] Int. Cl.$^4$ ............................................. A01D 46/08
[52] U.S. Cl. ............................................. 56/41; 56/28
[58] Field of Search ................ 56/28, 40, 41, 30, 44, 56/45

[56] References Cited

U.S. PATENT DOCUMENTS

| 2,986,861 | 6/1961 | Hubbard | 56/41 |
| 3,047,996 | 8/1962 | Hubbard | 56/41 |
| 4,660,359 | 4/1987 | Deutsch | 56/30 |

FOREIGN PATENT DOCUMENTS 234777 1/1969 U.S.S.R. ............................... 56/44

Primary Examiner—John Weiss

[57] ABSTRACT

Cotton suction doors for a cotton picker are rotationally molded from cross-linked polyethylene. Support and guide structure automatically direct the door structure to the operating position alongside the discharge openings in the row unit. The door structure includes two individual compartment structures which are movable in sequence and interlock with each other and with nozzle structure and duct structure to provide a compact and lightweight arrangement which is easy to attach to and remove from the row unit.

23 Claims, 3 Drawing Sheets

MOLDED COTTON DOOR AND MOUNTING STRUCTURE THEREFOR

BACKGROUND OF THE INVENTION

The present invention relates generally to cotton harvesters and more specifically to the suction door structure on a cotton picker row unit.

Typically a cotton picker includes one or more row units having upright picker drums and doffing units which doff the cotton from the spindles on the drums and direct it into suction door structure. The door structure is connected to conveying ducts which remove the cotton from the harvesting area. Most presently available doors are fabricated from metal which require complex spot welding and are relatively expensive to fabricate. The metal doors must also be painted for appearance and to cut down on corrosion. The doors are heavy and are easily dented and bent.

In narrow row units having side delivery of cotton into a narrow door structure, such as shown in U.S. application, Ser. No. 935,460 of Timothy A. Deutsch and Arthur L. Hubbard filed 26 Nov. 1986 and of common ownership with the present invention, there is very little room between the units to gain access to the door structure and the fastener assemblies associated therewith. In addition, the spindles on the drum project outwardly in the direction of the door structure so that the structure has to be moved transversely to clear the projecting spindles. Removing and attaching the heavy metal door structure is therefore a difficult and awkward task.

BRIEF SUMMARY OF THE INVENTION

It is therefore an object of the present invention to provide an improved door for the row unit of the cotton harvester. It is a further object to provide such a door which is lighter in weight, less expensive to fabricate, and has an improved inner surface for better cotton flow than most previously available door structures.

It is a further object of the present invention to provide an improved door structure for a cotton harvester which improves the serviceability of the row unit. It is a further object to provide such a structure which is easily removed from and attached to the row unit even when the units are closely spaced, for example, when the units are arranged for harvesting narrow row cotton.

It is still another object if the present invention to provide an improved door structure for a narrow row unit having cotton drums arranged in tandem. It is a further object to provide such a structure which can be moved easily in the fore-and-aft direction between a mounted position on the row unit and a dismounted position. It is still another object to provide such a structure with a guide track arrangement for guiding the door into position as it is moved alongside the row unit. It is still another object to provide such a structure which is lightweight and inexpensive to fabricate and which can be handled easily by a single operator even in a confined space between two closely adjacent row units.

It is a further object of the present invention to provide multi-sectioned door structure with compartments that interlock in sequence to facilitate mounting and removal of the door structure with respect to the row unit. It is a further object to provide such a structure wherein the door sections are made of a lightweight flexible material and are automatically located and secured in position as they are moved adjacent the row unit. It is another object to provide such a structure wherein removal of and mounting of the door structure is accomplished with substantially linear motion in the fore-and-aft direction.

It is yet another object of the present invention to provide improved door structure for a cotton harvester including guide structure for automatically locating the door structure as it is moved relative to the row unit. It is a further object to provide such a door structure which automatically locks in position as it reaches a preselected location with respect to the row unit. It is a further object to provide such structure with an air nozzle inlet which automatically receives an air nozzle fixed to the row unit frame as the door structure is positioned along the row unit.

In carrying out the present invention, the door structure for a cotton harvester includes rotational molded doors made from cross-linked polyethylene. Each door is made from a single mold without requiring additional structure except for attaching hardware. Openings are cut in the molded doors as necessary to receive cotton from the doffers and to convey the cotton to the air duct system. The doors are lighter in weight and lower in cost than doors which are formed from sheet metal. The inside of the door structure is smooth and rounded for improved cotton flow, and no painting is necessary. The polyethylene holds its shape well and does not dent or bend.

In accordance with one aspect of the invention, a simple but effective locking structure is provided utilizing the interlocking of the door structure between air nozzle and lower duct structure to retain the structure in position on a lower support structure. Another aspect of the invention includes providing a track arrangement for guiding the door structure into position around protruding spindles or other structure which would otherwise hamper attachment of the door structure to the unit where space is limited adjacent the units. The guiding structure includes a slotted lower panel upon which the floor of the door structure rests. Tapered projections extend downwardly from the door structure into the slotted portion, and as the door structure is moved in one direction toward the operating position, the slot guides the door structure around any obstacles, such as the protruding spindles, and into position adjacent the row unit. The door structure is molded with an integral handle to facilitate attachment and removal. The operator may simply grasp the door structure by the handle and pull or push generally in a single direction as the track member guides the door structure along the proper path. This feature, in combination with the automatic latching feature which releasably secures the door structure in the operating position significantly enhances the serviceability of the row unit.

Another aspect of the present invention includes providing a serial arrangement of two compartments wherein each compartment is movable in turn in generally the same direction adjacent the row unit to final operating positions wherein the second door structure is in communication with the first door structure and wherein both structures lock automatically as they reach the operating position. Track structure is provided to guide the first unit around any obstacles into position and to guide the second unit into communication with the first unit and into position adjacent a second row unit opening offset from the first row unit opening. The track structure includes a ramped portion which helps secure the second door structure from unwanted movement once the second door structure is located in position on the row unit. This structure is particularly advantageous, for example, in narrow row cotton harvesting units wherein the spacing between the units is generally inadequate to provide any substantial lateral movement of the door structure during mounting and dismounting of the structure.

These and other objects, features and advantages of the present invention will become apparent to those skilled in the art from the description which follows and from the drawings.

DESCRIPTION OF THE PREFERRED EMBODIMENT

Figure 1:
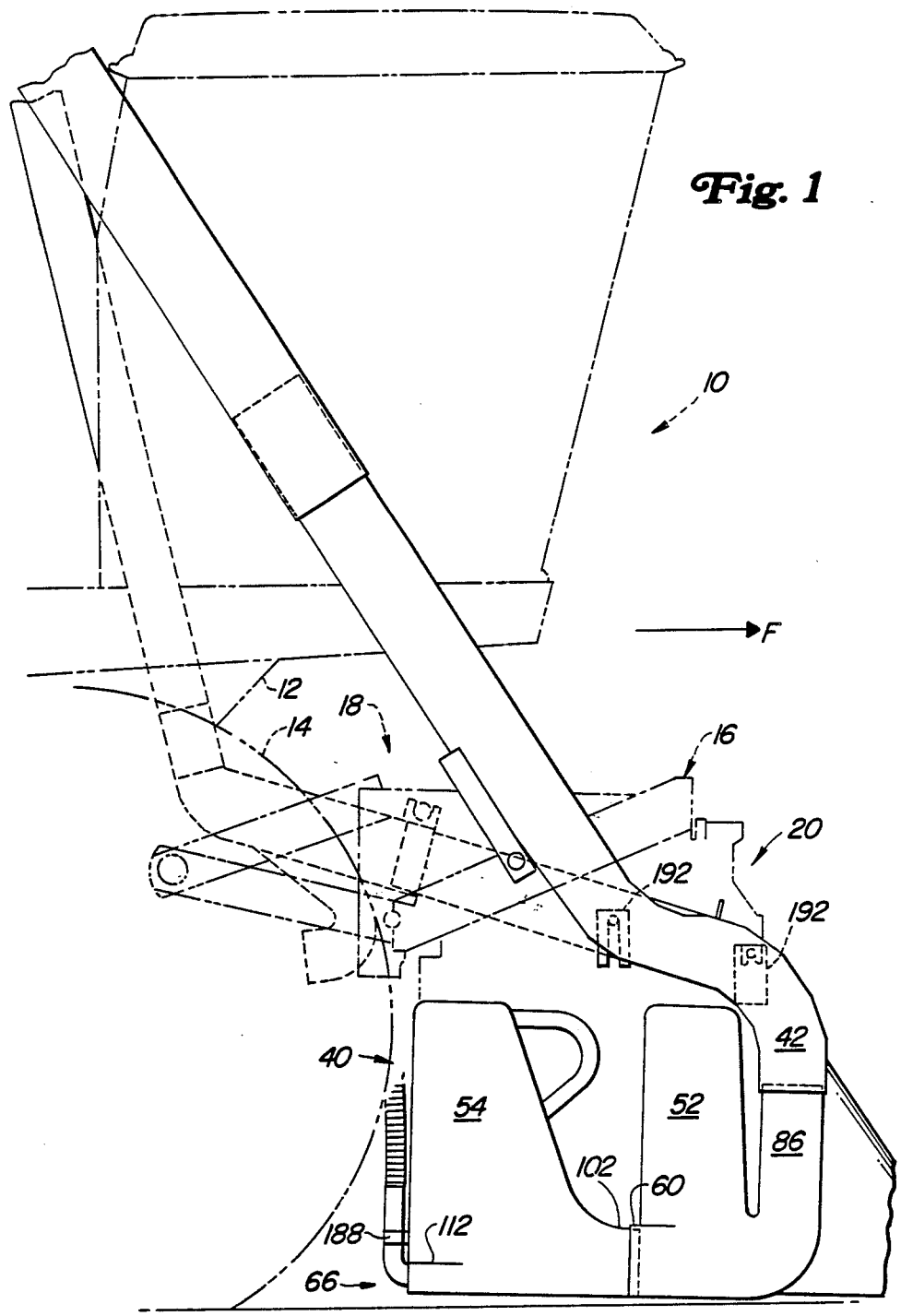
FIG. 1 is a side view of the front portion of a cotton harvester with the door structure of the present invention attached thereto.

Referring to FIG. 1, there is shown a cotton harvester 10 having a main frame 12 supported by drive wheels 14 for forward movement over a field planted in parallel rows of cotton plants. Row unit support frame structure 16 is connected to the harvester frame 12 by lift structure 18 for movement vertically with respect to the frame 12. A plurality of row units 20 for harvesting cotton from the rows of the plants are spaced transversely on the support frame structure 16. Each row unit 20 includes a fore-and-aft extending frame 22 defining a forwardly opening row-receiving area 24 (FIG. 3) and supporting front and rear upright picker drums 26 and 28 arranged in tandem on one side of the row-receiving area 24. The picker drums 26 and 28 are of conventional construction and include spindles which project into the row-receiving area to remove cotton from the cotton plants. Doffer mechanisms 32 and 34 are rotatably supported rearwardly and outwardly of the respective drums 26 and 28 for doffing the cotton from the spindles and directing it outwardly through upright openings 36 and 38, respectively, located in the side of the row unit 20 opposite the row-receiving area 24. For a more detailed description of the row units, reference may be had to the aforementioned co-pending U.S. application Ser. No. 935,460 of Timothy A. Deutsch and Arthur L. Hubbard. The tandem design of the row unit 20 provides a narrow configuration so that the units may be spaced closely together for harvesting narrow row cotton. Narrow, lightweight suction door structure 40 is releasably supported adjacent the side of the row unit 20 opposite the row-receiving area 24 for receiving cotton directed outwardly through the openings 36 and 38 and for directing the removed cotton upwardly through removable air duct structure 42 connected to the forward portion of the door structure 40.

Figure 2:
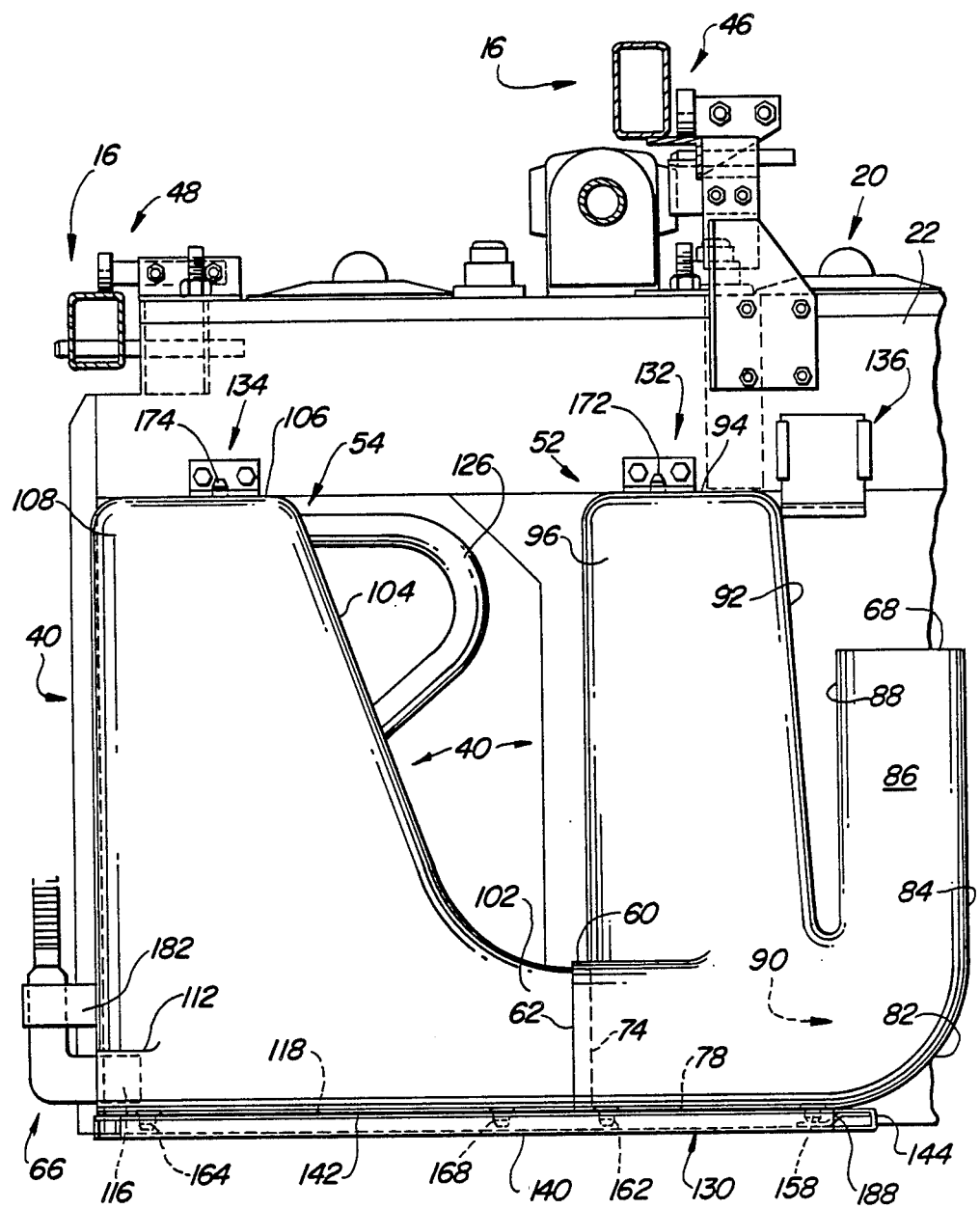
FIG. 2 is an enlarged side view of a portion of the row unit on the harvester of FIG. 1.
Figure 3:
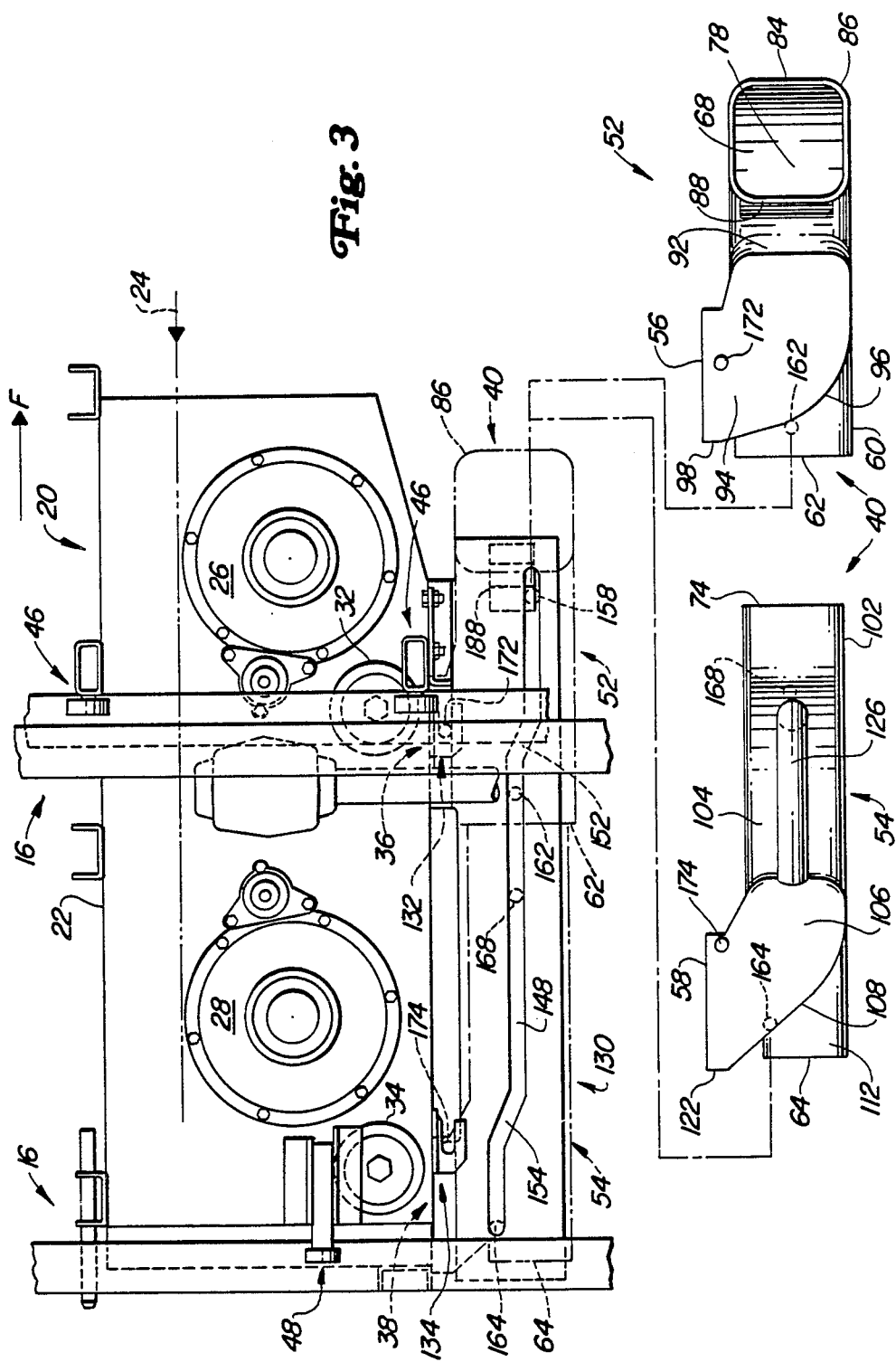
FIG. 3 is a top view of a row unit of the harvester of FIG. 1 showing the two compartments of the door structure removed from the unit and the sequence for attaching the compartments to the row unit.

In the embodiment as shown in FIGS. 2 and 3, the row units 20 are preferably suspended from the support frame structure 16 by roller assemblies 46 and 48 for permitting the units 20 to be adjusted laterally on the frame to open up space between the units for servicing and to adjust the units for different row widths and row configurations. For further details of the row unit support arrangement, reference may be had to co-pending application Ser. No. 87,073, of Steven A. Junge and Timothy A. Deutsch, filed concurrently herewith and of common ownership with the present application.

To facilitate manufacturing, and mounting and removal of the door structure 40 with respect to the row unit 20, the door structure 40 is fabricated as two separate compartments or doors 52 and 54. Each of the doors 52 and 54 is fabricated from a lightweight cross-linked polyethylene which is rotationally molded in a single mold. Upright openings 56 and 58 are cut in the sides of the doors 52 and 54 for conforming to and alignment with the upright openings 36 and 38, respectively, in the side of the row unit 20. A rearwardly directed projection 60 opens at 62 in the lower aft end of the door 52 to receive the forward lower end of the door 54. A lower rearwardly directed opening 64 is provided in the lower aft end of the door 54 to receive forwardly directed nozzle structure, shown at 66 in FIGS. 1 and 2. An upwardly directed opening 68 is provided in the forward portion of the door 52 and is received in the lower end of the removable air duct structure 42 (FIG. 1). An opening 74 is also provided at the lower forward end of the door 54 which is received within the opening 62 of the projection 60.

The door 52 includes a relatively flat lower floor portion 78, extending forwardly from the opening 72, which curves upwardly at 82 to an upright forward wall 84 of a duct portion 86 having a generally rectangular configuration (FIG. 3). A rear wall 88 extends downwardly from the opening 68 and joins an upwardly and slightly rearwardly sloping front wall 92 of the cotton receiving area of the door 52 substantially above the floor 78 to define an opening 90 for connecting the cotton receiving area with the duct portion 86. A horizontal top portion 94 extends rearwardly from the wall 92 to a generally vertical rear compartment wall 96 which curves outwardly in the forward direction (FIG. 3) and which extends downwardly to the rearward projection 60. The compartment 52 projects inwardly at 98 so that the upright opening 56 for receiving cotton is located inwardly of the corresponding inner sidewall portion of the door 52. Cotton doffed from the drum 26 by the doffer 32 is directed through the opening 36 and the corresponding opening 56 into the door 52 and drops toward the floor 78 and toward the opening 90 to the duct portion 86.

The door 54 includes a lower forwardly projecting portion 102 defining the opening 74 and sized to fit somewhat loosely within the opening 62 of the door 52. A front wall 104 slopes rearwardly in the upward direction to a horizontal top portion 106 which extends rearwardly to a connection with a forwardly curved and generally vertical rear wall 108. The rear wall 108 extends downwardly to a rearwardly directed nozzle supporting projection 112 which defines the opening 64 and is slidably received over a front portion indicated at 116 (FIG. 2) of the air nozzle 66. A generally horizontal and relatively flat floor 118 closes the lower portion of the compartment 54 between the compartment sidewalls. As best seen in FIG. 3, the door 54 also includes an inwardly projecting portion 122 extending substantially the height of the compartment and defining the opening 58 therein.

A large handle 126 which projects forwardly a substantial distance from the upper portion of the front wall 104 is molded integrally with the compartment 54 to permit the operator to easily grasp the compartment for removal and attachment of the compartment even in confined space between row units 20. Once the forward compartment 52 is removed, as will be described in detail later, the operator can merely grasp the handle 126 and with a single pull in the forward direction remove the remaining compartment 54 with a minimum amount of effort, even without opening up the space between the row units 20.

As can be appreciated readily from FIGS. 2 and 3, the inner surfaces of the compartments 52 and 54 include smooth rounded contours for improved cotton flow. The rotational molding of the compartment from cross-linked polyethylene provides a low cost, lightweight door which requires no painting and which does not dent or bend.

Lower support and guide structure 130 is connected to the floor portion of the row unit frame 22 and projects outwardly therefrom to support the doors 52 and 54 and to guide the door structure into position around obstacles as the compartments 54 and 52 are positioned in turn at their respective operating locations adjacent the upright discharge openings 36 and 38 in the row unit. Upper bracket structures 132 and 134 help locate the doors 52 and 54, respectively, in the rearward direction as they are assembled onto the row unit 20 and provide some rear support for the upper portions of the compartments. A slidable retaining member 136 or the like (FIG. 2) is provided to restrain the upper portion of the compartment 52 from forward movement.

The lower support and guide structure 130 includes a lower floor portion 140 and an upper floor portion 142 offset slightly above the portion 140 by side and end wall structure 144. The structure 130 is generally rectangular in configuration having a length in the fore-and-aft direction substantially greater than its width and extending from a forward portion located adjacent the front drum 26 to the rear of the row unit 20. The upper floor portion 142 includes a generally fore-and-aft extending slotted portion 148 extending substantially the length of the structure 30 and angling inwardly at locations 152 and 154.

Tapered projecting members 158 and 162 are located near the forward and rearward portions of the floor 78 of the compartment 52 and are adapted for receipt by the slot 148. Tapered projections 164 and 168 are also located in floor 118 of the compartment 54 near the nozzle support projection 112 and the forward projecting portion 102, respectively. As best seen in FIG. 3, the projections 162 and 168 are generally aligned in the fore-and-aft direction when the door structure 40 is assembled onto the row unit 20. The projection 158 is located outwardly of the projections 162 and 168 and the projection 164 is located inwardly from the projections 162 and 168.

Upwardly directed projections 172 and 174 are connected to the horizontal top portions 94 and 106 of the compartments 52 and 54, respectively, near the inner edge of the corresponding projections 98 and 122. Each of the upper bracket structures 132 and 134 includes an angle having n upwardly projecting flange bolted to the lower portion of the gear housing on the row unit 20 and a horizontal portion (FIG. 3) opening in the forward direction for receiving the corresponding projections 172 and 174 therein.

To assemble the door structure 40 onto the row unit 20, the operator grasps the handle 126 of the compartment 54, inserts the projection 164 into the slot 148 and pushes the compartment 54 rearwardly. The second projection 168 will settle into the slot 148, and the slot 148 will guide the compartment 54 as it is pushed rearwardly. The projection 164 initially maintains the portion 122 of the compartment 54 outwardly away from the row unit so that the portion 122 can clear the areas where the spindles on the drums or any other objects project outwardly beyond the side of the row unit. As the projection 164 reaches the angled portion 154 of the slot 148, the door 54 is guided inwardly so that the portion 122 abuts the side of the row unit with the compartment opening 58 coinciding with the upright discharge opening 38 on the unit 20. At the same time, the rearwardly directed nozzle support projection 112 is received over the front 116 of the nozzle 66. The downwardly directed tapered projection 164 bottoms against the rear of the slot 148 while the upwardly directed projection 174 bottoms against the rear portion of the U-shaped slot in the bracket 134. The floor 118 of the compartment 54 rests on the upper floor portion 142 of the support and guide structure 130. The nozzle 66, which is fixed to the row unit frame 22 by a bracket 182 (FIG. 2) and which is received within the opening 64 in the projection 112, prevents the aft end of the compartment 54 from lifting substantially from the position shown in FIG. 2. The operator then slides the forward compartment 52 over the support and guide structure 130 with the tapered projection 162 guiding the structure around obstacles as the projection 162 slides in the slot 148 The opening 62 in the rearwardly projecting portion 60 of the compartment 52 is received over the forwardly projecting portion 102 of the compartment 54 as the projection 162 moves inwardly at the angled portion 152 of the slot. The slot 148 thus guides the lower portion of the compartment 52 into position with the upper projection 172 seating in the forwardly opening U-shaped portion of the bracket 132. As the compartment 52 approaches its final attached position, the projection 158 drops into the forward end of the slot 148 with the floor 78 resting on the support and guide structure 130. The projection 162 is positioned such that it acts as a stop which contacts the forward edge of the forward projecting portion 102 of the compartment 54 (FIG. 2). The projection 102 and the bracket 132 prevent the aft portion of the compartment 52 from lifting. The retaining member 136 may be slid downwardly against the top portion of the front wall 92 of the compartment 52 to help secure the compartments in the fore-and-aft direction. Preferably, the member 136 is part of an inspection door or the like which is normally closed and in the locking position as shown in FIG. 2 during operation of the row unit 20.

To facilitate insertion and removal of the projections 158–168 within the slot 148, a ramp member 188 is provided which slopes downwardly in the rearward direction from the front edge of the slot 148.

Once the forward compartment 52 is secured in position between the support and guide structure 130 and the bracket 132, the removable air duct structure 42 is slid over the opening 68 of the duct portion 86 as shown in FIG. 1. The duct 42, which is removably held in position by brackets 192, also helps to stabilize the door structure 40. The above-described structure provides a stable door structure configuration using a minimum number of brackets or other connecting structure while still permitting easy assembly and disassembly of the door structure even where space between units is very limited such as is the situation when the row units 20 are spaced for harvesting narrow row cotton.

To disassemble the door structure 40, the operator simply lifts the duct structure 42 from the duct portion 86 and raises the movable bracket 136 away from the front wall 92 of the compartment 52. The operator then grasps the compartment 52 and pulls it forwardly out from between the row units 20. Thereafter, the operator grasps the handle 126 and pulls forwardly to slide the rear compartment 54 out from the nozzle 66 and away from the bracket 134. The lower support and guide structure 130 advantageously guides the compartments 52 and 54 around any obstacles such as projecting cotton picker spindles so that the operator need not reach in and move the compartments 52 and 54 laterally as they are being removed. Therefore, it can be appreciated that the attachment and removal of the door structure 40 can be accomplished easily and quickly with simple fore-and-aft movements, and the doors are automatically locked into position as the structures are assembled onto one another.

In operation, the drums 26 and 28 remove cotton from the row of cotton plants and the doffers 32 and 34 direct the removed cotton through the corresponding upright discharge openings 36 and 38 in the row unit and the openings 56 and 58 and into the corresponding doors 52 and 54. The cotton drops downwardly and forwardly and is propelled forwardly over the floors 78 and 118 by air from the nozzle 66. The cotton from the rear compartment 54 is directed through the openings 74 and 62 into the lower portion of the compartment 52 and is mixed with the cotton falling in the compartment 52. Thereafter, the combined cotton is propelled through the opening 90 and upwardly in the duct portion 86 by air from the nozzle 66 and air flow induced in a conventional manner by a nozzle downstream in the cotton conveying system.

Having described the preferred embodiment, it will be apparent that modifications can be made without departing from the scope of the invention as defined in the accompanying claims.

We claim:

1. In a cotton harvester adapted for forward movement over a field of cotton plants and having a row unit with a cotton discharge opening, means for harvesting cotton from the cotton plants and directing harvested cotton through the opening, door structure for receiving the cotton directed through the opening comprising:
    a compartment including a compartment opening;
    means for supporting the compartment adjacent the row unit with the compartment opening located adjacent the row unit opening for receiving harvested cotton from the row unit; and
    elongated guide means slidably receiving the compartment for generally linear advancement of the compartment along the guide means between a removed position offset from the row unit opening and an operating position adjacent the row unit opening.

2. The invention as set forth in claim 1 wherein the guide means comprises a member connected to the two unit and having an elongated slot, and the compartment includes a projecting member received within the slot for constraining the compartment for movement generally along the slot.

3. The invention as set forth in claim 1 further including a nozzle member supported adjacent the guide means, and wherein the compartment includes a nozzle receiving portion slidably received by the nozzle as the compartment is advanced along the guide means toward the operating position.

4. The invention as set forth in claim 1 wherein the compartment comprises a unitary rotational molded structure fabricated from cross-linked polyethylene.

5. The invention as set forth in claim 1 wherein the guide means includes means for guiding the compartment outwardly around the means for harvesting as the compartment is moved between the removed and operating positions.

6. The invention as set forth in claim 3 wherein said door structure further includes an upwardly directed duct portion offset on the opposite side of the compartment from the nozzle receiving portion, and means for releasably supporting the compartment with the nozzle projecting into the nozzle receiving portion, said means for releasably supporting including removable air duct structure slidably received over the duct portion.

7. The invention as set forth in claim 5 wherein the compartment includes an upright portion defining the compartment opening, said upright portion projecting toward the row unit, said means for guiding the compartment including means for automatically moving the upright portion closely adjacent the row unit opening as the compartment is moved toward the operating position.

8. In a cotton harvester adapted for forward movement over a field of cotton plants and having a row unit with a cotton discharge opening, means for harvesting cotton from the cotton plants and directing harvested cotton through the opening, door structure for receiving the cotton directed through the opening comprising:
    a compartment including a compartment opening;
    means for supporting the compartment adjacent the row unit with the compartment opening located adjacent the row unit opening for receiving harvested cotton from the row unit; and
    guide means slidably receiving the compartment for guiding the compartment between a removed position offset from the row unit opening and an operating position adjacent the row unit opening; and
    a second compartment, and means for positioning the second compartment in interlocking relationship with the first compartment.

9. The invention as set forth in claim 8 wherein the means for positioning the second compartment includes means associated with the guide means for guiding the second compartment between an operating position in contact with the first-mentioned compartment and a removed position offset from the first-mentioned compartment.

10. In a cotton harvester adapted for forward movement over a field of cotton plants and having a row unit with first and second spaced apart cotton discharge openings, means for harvesting cotton from the cotton plants and directing harvested cotton through the openings, door structure for receiving the cotton directed through the openings comprising:
    first and second discharge doors including matingly engageable lower portions;
    means for supporting the first discharge door in a mounted position adjacent the first discharge opening for receiving cotton directed through said first discharge opening;

means for supporting the second discharge door in a mounted position, with said lower portions in mating engagement, for receiving cotton directed through the second discharge opening; and means for moving the first and second doors generally linearly in a preselected direction in sequence between the mounted positions and removed positions, including means for securing the doors in position as they are moved to the mounted positions.

11. The invention as set forth in claim 10 including track means for guiding at least one of the compartments to its mounted position as it is moved linearly.

12. The invention as set forth in claim 11 including means for imparting a motion generally transverse to the preselected direction to said one of the compartments as it is moved linearly to thereby guide said one of the compartments out of interfering relationship with the row unit as said one of the compartments is moved toward and away from its mounted position.

13. The invention as set forth in claim 10 wherein the means for securing includes nozzle means secured to the row unit and slidably received by a one of the compartments.

14. The invention as set forth in claim 11 wherein the doors are fabricated from plastic and the means for securing includes bracket means offset from the track means, and wherein the doors are secured between the bracket means and the track means.

15. The invention as set forth in claim 10 wherein at least one of the doors is molded from a plastic material and includes an integral handle projecting a substantial distance outwardly in the preselected direction.

16. The invention as set forth in claim 13 wherein the other of said one of the compartments includes a duct portion and the means for securing further includes removable duct means selectively attachable to the duct portion.

17. In a cotton harvester including a pair of transversely spaced upright cotton harvesting row units defining a relatively narrow fore-and-aft extending space therebetween, wherein at least one of the units includes a discharge area for directing harvested cotton outwardly in the direction of the spaced, door structure for receiving the outwardly directed cotton comprising:

support structure located adjacent the discharge area near the bottom of the row units in the space and including a fore-and-aft extending guide portion;

a compartment including a floor portion slidably received on the support structure for fore-and-aft movement of the compartment between mounted and dismounted positions, and wall means extending upwardly from the floor portion and including an aperture sidewall opening inwardly toward the discharge area; and wherein the guide portion includes means for guiding the apertured sidewall generally in a direction transverse to the fore-and-aft direction adjacent the discharge area as the compartment is slid in the fore-and-aft direction from the dismounted to the mounted position.

18. The invention as set forth in claim 17 wherein the row unit includes a second discharge area, said door structure further comprising a second compartment carried on the support structure for movement of the compartment between mounted and dismounted positions and including an apertured sidewall adapted for positioning in a mounted position adjacent the second discharge area.

19. In a cotton harvester including a pair of transversely spaced upright cotton harvesting row units defining a relatively narrow fore-and-aft extending space therebetween, wherein at least one of the units includes a discharge area for directing harvested cotton outwardly in the direction of the space, door structure for receiving the outwardly directed cotton comprising:

support and guide structure located adjacent the discharge area near the bottom of the row units in the fore-and-aft extending area;

a compartment including a floor portion slidably received on the support and guide structure for movement of the compartment between mounted and dismounted positions, and wall means extending upwardly from the floor portion and including an apertured sidewall opening inwardly toward the discharge area; and wherein the support and guide structure includes means for guiding the apertured sidewall adjacent the discharge area as the compartment is slid to the mounted position;

wherein the row unit includes a second discharge area, said door structure further comprising a second compartment carried on the support structure for movement of the compartment between mounted and dismounted positions and including an apertured sidewall adapted for positioning in a mounted position adjacent the second discharge area; and wherein the first-mentioned compartment and the second compartment include slidable mating portions engageable as the compartments are moved to the mounted positions.

20. The invention as set forth in claim 19 including nozzle means secured to a one of the row units for engaging the first-mentioned compartment as said compartment is moved to the mounted position.

21. The invention as set forth in claim 20 wherein the mating portions define cotton conveying openings for connecting the compartments, and the nozzle means includes means for directing air through the cotton conveying openings.

22. The invention as set forth in claim 20 wherein the second compartment includes an upwardly extending duct portion opening into the cotton receiving area of the compartment, and means for restraining movement of the second compartment relative to the first including removable duct structure connected to the duct portion.

23. The invention as set forth in claim 20 wherein nozzle means and the first-mentioned compartments include matingly engageable portions for restraining movement of the compartments from the mounted positions.

* * * * *